(12) United States Patent
Abonyi (10) Patent No.: US 10,752,280 B2
(45) Date of Patent: Aug. 25, 2020

(54) INTERMEDIATE STEERING SHAFT FOR A MOTOR VEHICLE, AND METHOD FOR OPERATING AN INTERMEDIATE STEERING SHAFT FOR A MOTOR VEHICLE

(71) Applicant: Robert Bosch Automotive Steering GmbH, Schwäbisch Gmünd (DE)

(72) Inventor: Olivér Abonyi, Egerszalok (HU)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 325 days.

(21) Appl. No.: 15/739,609

(22) PCT Filed: Jun. 27, 2016

(86) PCT No.: PCT/EP2016/064773
§ 371 (c)(1),
(2) Date: Dec. 22, 2017

(87) PCT Pub. No.: WO2017/001308
PCT Pub. Date: Jan. 5, 2017

(65) Prior Publication Data
US 2018/0154922 A1    Jun. 7, 2018

(30) Foreign Application Priority Data

Jun. 30, 2015    (DE) .................. 10 2015 110 457

(51) Int. Cl.
*B62D 1/185* (2006.01)
*B62D 1/20* (2006.01)
(Continued)

(52) U.S. Cl.
CPC .............. *B62D 1/185* (2013.01); *B62D 1/16* (2013.01); *B62D 1/20* (2013.01); *F16C 3/035* (2013.01);
(Continued)

(58) Field of Classification Search
CPC .. B62D 1/185; B62D 1/16; B62D 1/20; F16C 3/035; F16C 23/086; F16C 29/002;
(Continued)

(56) References Cited

U.S. PATENT DOCUMENTS 6,343,993 B1 * 2/2002 Duval ..................... B62D 1/16
464/167
2006/0053934 A1    3/2006 Bahr et al.
(Continued)

FOREIGN PATENT DOCUMENTS

DE    600 27 225 T2    1/2007
EP    1 512 607 A1    3/2005
(Continued)

OTHER PUBLICATIONS

International Search Report corresponding to PCT Application No. PCT/EP2016/064773, dated Sep. 20, 2016 (German and English language document) (5 pages).

*Primary Examiner* — Greg Binda
(74) *Attorney, Agent, or Firm* — Maginot, Moore & Beck LLP (57) ABSTRACT

An intermediate steering shaft for a motor vehicle includes an elastic element arranged and formed (i) at least partially in a first recess and second recess formed in a receiving section of a profile shaft, and (ii) at least partially in a recess formed in a first guide rail and a recess formed in a second guide rail, in order to apply a pretension to a respective guide arrangement.

12 Claims, 6 Drawing Sheets

(51) Int. Cl.
*B62D 1/16* (2006.01)
*F16C 3/035* (2006.01)
*F16C 23/08* (2006.01)
*F16C 29/00* (2006.01)
*F16C 29/04* (2006.01)
*F16C 29/12* (2006.01)
*F16D 3/06* (2006.01)

(52) U.S. Cl.
CPC .......... *F16C 23/086* (2013.01); *F16C 29/002* (2013.01); *F16C 29/04* (2013.01); *F16C 29/123* (2013.01); *F16D 3/065* (2013.01); *F16C 2326/24* (2013.01)

(58) Field of Classification Search
CPC .... F16C 29/04; F16C 29/123; F16C 2326/24; F16D 3/065
USPC .............................................. 464/167; 384/54
See application file for complete search history.

(56) References Cited

U.S. PATENT DOCUMENTS

| | | |
|---|---|---|
| 2011/0098121 A1 | 4/2011 | Bahr et al. |
| 2013/0079165 A1 | 3/2013 | Fevre et al. |
| 2018/0029631 A1* | 2/2018 | Abonyi .................. F16C 29/04 |

FOREIGN PATENT DOCUMENTS

| | | |
|---|---|---|
| EP | 1 566 324 A1 | 8/2005 |
| GB | 2 395 995 A | 6/2004 |

* cited by examiner

INTERMEDIATE STEERING SHAFT FOR A MOTOR VEHICLE, AND METHOD FOR OPERATING AN INTERMEDIATE STEERING SHAFT FOR A MOTOR VEHICLE

This application is a 35 U.S.C. § 371 National Stage Application of PCT/EP2016/064773, filed on Jun. 27, 2016, which claims the benefit of priority to Serial No. DE 10 2015 110 457.1, filed on Jun. 30, 2015 in Germany, the disclosures of which are incorporated herein by reference in their entirety.

The disclosure relates to an intermediate steering shaft for a motor vehicle. The disclosure also relates to a method for operating an intermediate steering shaft for a motor vehicle.

BACKGROUND

Intermediate steering shafts are generally designed such that they can be lengthened and/or shortened. In this way, it is sought to achieve that relative movements that occur between a driver's cab and a vehicle chassis during driving operation of the motor vehicle do not have an adverse effect on the steering characteristics.

US 2011/0098121 A1 discloses a device for coupling an inner shaft and an outer shaft which are displaceable in the direction of a common axis. Balls are provided between the two shafts. The balls are arranged in axial grooves of the inner shaft and in axial grooves of the outer shaft. Each row of balls is held in position by an dual elastic element arranged in the groove of the inner shaft, which elastic element exerts a spring force on a roller track such that the respective balls are held between the roller track and the axial groove formed in the outer shaft.

As a result of the requirement for the spring force loading of the roller track for positioning and holding the balls between the roller track and the axial groove formed in the outer shaft with a relatively large spring travel, a relatively large degree of play of the balls in the roller track arises. Furthermore, the abovementioned device is not suitable for use in the field of heavy goods vehicles and the associated material loading.

The disclosure is therefore based on the object of specifying an intermediate steering shaft for a motor vehicle and a method for operating an intermediate steering shaft for a motor vehicle, which intermediate steering shaft is inexpensive to produce, is highly durable and permits effective play compensation of those components of the intermediate steering shaft which are displaceable relative to one another.

The object is achieved with an intermediate steering shaft for a motor vehicle having the features described herein and with a method for operating an intermediate steering shaft for a motor vehicle having the features described herein.

SUMMARY

The present disclosure provides an intermediate steering shaft for a motor vehicle, having an outer hollow shaft, having an inner hollow shaft which is arranged at least partially in the outer hollow shaft, having a profiled shaft which is arranged in the outer hollow shaft and which connects the outer hollow shaft and the inner hollow shaft to one another, having a multiplicity of guide arrangements which guide the profiled shaft in the outer hollow shaft and which serve for the displacement of the profiled shaft and of the inner hollow shaft, which is connected to said profiled shaft, in an axial direction of the outer hollow shaft, wherein the multiplicity of guide arrangements has a section of substantially concave form on an inner circumference of the outer hollow shaft, a first guide rail arranged on a receiving section of the profiled shaft, a second guide rail arranged on the receiving section of the profiled shaft, and a multiplicity of balls which are arranged in a cavity formed between the section of substantially concave form of the outer hollow shaft, the first guide rail and the second guide rail; and having an elastic element which is arranged between the first guide rail and the receiving section of the profiled shaft and between the second guide rail and the receiving section of the profiled shaft, wherein the elastic element is arranged at least partially in a first recess formed in the receiving section of the profiled shaft and at least partially in a recess and the second guide rail, and is designed to exert a preload on the respective guide arrangement.

The present disclosure furthermore provides a method for operating an intermediate steering shaft for a motor vehicle. The method comprises providing an outer hollow shaft. The method furthermore comprises providing an inner hollow shaft which is arranged at least partially in the outer hollow shaft. The method moreover comprises providing a profiled shaft which is arranged in the outer hollow shaft and which connects the outer hollow shaft and the inner hollow shaft to one another. The method furthermore comprises providing a multiplicity of guide arrangements which guide the profiled shaft in the outer hollow shaft and which serve for the displacement of the profiled shaft and of the inner hollow shaft, which is connected to said profiled shaft, in an axial direction of the outer hollow shaft, wherein the multiplicity of guide arrangements provides a section of substantially concave form on an inner circumference of the outer hollow shaft, a first guide rail arranged on a receiving section of the profiled shaft, and a second guide rail arranged on the receiving section of the profiled shaft, and a multiplicity of balls which are arranged in a cavity formed between the section of substantially concave form of the outer hollow shaft, the first guide rail and the second guide rail. The method furthermore comprises providing an elastic element at least partially in a first recess and second recess formed in the receiving section of the profiled shaft and at least partially in a recess formed in the first guide rail and in a recess formed in the second guide rail, which elastic element exerts a preload on the respective guide arrangement.

It is a concept of the present disclosure to improve an intermediate steering shaft for a motor vehicle such that the play compensation as a result of interaction of the respective guide rail with the elastic element permits continuous play compensation between the outer hollow shaft and the profiled shaft connected to the inner hollow shaft. By virtue of the elastic element exerting a preload on the guide arrangement, continuous play compensation between the outer hollow shaft and the profiled shaft can be realized. The intermediate steering shaft according to the disclosure moreover requires no separate play adjustment during the assembly process. Such an arrangement furthermore meets the requirements with regard to durability of the intermediate steering shaft for use in the field of utility vehicles.

Further advantages are improved vibration damping of the intermediate steering shaft through the provision of the elastic element between the respective guide rail and the receiving section of the profiled shaft. Furthermore, owing to an increased diameter in relation to known applications, the intermediate steering shaft exhibits greater stability of the guide rails within an identical play compensation range. Moreover, the intermediate steering shaft exhibits advantageously reduced friction during the axial adjustment of the inner hollow shaft relative to the outer hollow shaft.

Advantageous embodiments and refinements will emerge from the subclaims and from the description with reference to the figures.

According to a preferred refinement, it is provided that the receiving section of the profiled shaft, the first guide rail and the second guide rail are of arc-shaped form such that an arc shape of the first guide rail and of the second guide rail is substantially adapted to an arc shape of the receiving section of the profiled shaft. A low-resistance sliding movement of the respective first and second guide rail along the receiving section of the profiled shaft is thus advantageously possible.

According to a further preferred refinement, it is provided that a surface of the first guide rail, which surface is arranged so as to be situated opposite the receiving section of the profiled shaft, has, adjacent to the recess formed in the first guide rail for receiving the elastic element, a curvature at least in sections, which curvature is greater than a curvature of a surface of the receiving section of the profiled shaft, and a surface of the second guide rail, which surface is arranged so as to be situated opposite the receiving section of the profiled shaft, has, adjacent to the recess formed in the second guide rail for receiving the elastic element, a curvature at least in sections, which curvature is greater than a curvature of the surface of the receiving section of the profiled shaft.

Thus, the surface of the receiving section of the profiled shaft is contacted by the in each case first and second guide rails advantageously only in those regions of the first and second guide rails in which the first and second guide rails have a greater curvature than the curvature of the surface of the receiving section. In this way, a friction coefficient of the surface friction between the respective guide rail and the receiving section of the profiled shaft can be advantageously reduced.

According to a further preferred refinement, it is provided that the first guide rail and the second guide rail are mounted so as to be rotatable about the surface of the receiving section of the profiled shaft. In the event of a transmission of torque from the outer hollow shaft via the guide arrangement to the profiled shaft, it is thus possible, owing to the mounting of the first and second guide rails so as to be rotatable about the surface of the receiving section of the profiled shaft, for effective play compensation between the guide arrangement and the outer hollow shaft to be provided.

According to a further preferred refinement, it is provided that the first guide rail is arranged in relation to the receiving section of the profiled shaft such that the recess formed in the first guide rail for receiving the elastic element is arranged offset with a predetermined spacing with respect to the first recess formed in the receiving section of the profiled shaft for receiving the elastic element, and the second guide rail is arranged in relation to the receiving section of the profiled shaft such that the recess formed in the second guide rail for receiving the elastic element is arranged offset with a predetermined spacing with respect to the second recess formed in the receiving section of the profiled shaft for receiving the elastic element.

Owing to the offset arrangement of the first and second recesses of the open section of the profiled shaft in relation to the respective recesses of the first and second guide rails, the elastic element inserted into the respective cavity, which cavity is formed by the respective recess of the receiving section of the profiled shaft and the recess of the guide rail, is subjected to a shear load. The elastic element placed under shear load thus exerts a preload on the guide arrangement, in particular on the guide rails and on the multiplicity of balls which bear against the guide rails.

According to a further preferred refinement, it is provided that the elastic element can be placed under shear load in a width direction for the purposes of play compensation of the guide arrangement, and the elastic element is formed as a rubber or plastics profile. Owing to the shearing capability in conjunction with the formation of the elastic element from a bendable material, the elastic element is designed to exert a preload on the guide arrangement. Furthermore, the elastic element can be easily placed into the receiving section of the profiled shaft, whereby assembly of the intermediate steering shaft is simplified.

According to a further preferred refinement, it is provided that the multiplicity of balls is arranged in a ball cage which has a multiplicity of receiving devices of substantially hollow cylindrical form for receiving the balls, wherein a receiving device has in each case two semicylindrical receiving elements which are arranged spaced apart from one another in an axial direction of the receiving device and which are beveled in an insertion region for the insertion of the balls.

Through the provision of the ball cage for receiving the balls, it is advantageously possible for a braking effect, resulting from contact of the balls, during the axial displacement of the inner hollow shaft relative to the outer hollow shaft to be prevented.

According to a further preferred refinement, it is provided that the semicylindrical receiving elements are arranged spaced apart from one another in the axial direction such that a spacing between in each case two receiving elements of the receiving device in the insertion region for the insertion of the balls is smaller than a diameter of a respective ball. It can advantageously be achieved in this way that the receiving elements surround the respective balls after the insertion of the balls.

According to a further preferred refinement, it is provided that the multiplicity of receiving devices of substantially hollow cylindrical form is connected to a base section of the ball cage by means of a strip formed in the axial direction of the ball cage, wherein the receiving elements are bendable in the axial direction of the ball cage relative to the strip formed on the base section of the ball cage. The balls can thus be inserted into the receiving elements of the ball cage despite the fact that the receiving devices, in the insertion region for the insertion of the balls, have a diameter smaller than a diameter of the respective balls. After the insertion of the balls into the receiving devices by flexing of the receiving elements in the axial direction of the ball cage, the receiving elements snap back into their original position and thus advantageously prevent a removal of the balls from the ball cage.

According to a further preferred refinement, it is provided that an axial end stop of the ball cage is formed by delimiting rings arranged on the profiled shaft at axial end sections of the ball cage, wherein the delimiting rings are fixed on the profiled shaft in each case by means of a securing ring. The ball cage can thus advantageously be arranged in a predetermined region and secured in an axial direction of the profiled shaft.

According to a further preferred refinement, it is provided that the inner hollow shaft and the profiled shaft have, in an overlap region, in each case mutually adjacently arranged sections which are of concave form in a circumferential direction, wherein the concavely formed section of the inner hollow shaft engages with the concavely formed section of the profiled shaft for the purposes of axially fastening the profiled shaft to the inner hollow shaft. The profiled shaft can thus, after insertion into the inner hollow shaft, advantageously be fixed by formation of the sections, which are of concave form in the circumferential direction, of the profiled shaft and of the inner hollow shaft, for example by means of pressing-in in an axial direction.

According to a further preferred refinement, it is provided that the first guide rail and the second guide rail are mounted so as to be rotatable about a surface of the receiving section of the profiled shaft. In the event of a transmission of torque from the outer hollow shaft via the guide arrangement to the profiled shaft, it is thus possible, owing to the mounting of the first and second guide rails so as to be rotatable about the surface of the receiving section of the profiled shaft, for effective play compensation between the guide arrangement and the outer hollow shaft to be provided.

According to a further preferred refinement, it is provided that the elastic element is placed under shear load in a width direction for the purposes of play compensation of the guide arrangement. Owing to the shearing capability in conjunction with the formation of the elastic element from a bendable material, the elastic element is designed to exert a preload on the guide arrangement.

According to a further preferred refinement, it is provided that a ball cage is provided for receiving the multiplicity of balls, wherein the ball cage is designed such that, during an insertion of the balls into semicylindrical receiving elements, which are arranged spaced apart from one another in an axial direction, of a multiplicity of receiving devices of substantially hollow cylindrical form, respective receiving elements whose spacing in an insertion region of the balls is smaller than a diameter of a respective ball are bent in an axial direction of the ball cage.

Through the provision of the receiving elements, the spacing of which in an insertion region of the balls is smaller than a diameter of the respective ball, it can advantageously be achieved that the receiving elements surround the respective balls after insertion of the balls. Thus, the balls can be inserted into the receiving elements of the ball cage despite the fact that the receiving devices have, in the insertion region for the insertion of the balls, a diameter smaller than a diameter of the respective ball. After insertion of the balls into the receiving devices by bending of the receiving elements in an axial direction of the ball cage, the receiving elements snap back into their original position and thus advantageously prevent a removal of the balls from the ball cage.

According to a further preferred refinement, it is provided that the profiled shaft is fastened to the inner hollow shaft by the formation of sections, which are of concave form in a circumferential direction, into the profiled shaft and into the inner hollow shaft in an overlap region of the profiled shaft and of the inner hollow shaft, wherein the concavely formed section of the inner hollow shaft engages with the concavely formed section of the profiled shaft. The profiled shaft can thus, after insertion into the inner hollow shaft, advantageously be fixed by formation of the sections, which are of concave form in the circumferential direction, of the profiled shaft and of the inner hollow shaft, for example by means of pressing-in in an axial direction.

The described embodiments and refinements may be combined with one another in any desired manner.

Further possible embodiments, refinements and implementations of the disclosure also encompass combinations, not explicitly mentioned, of features of the disclosure described above or described below with regard to the exemplary embodiments.

BRIEF DESCRIPTION OF THE DRAWINGS

The appended drawings are intended to convey further understanding of the embodiments of the disclosure. They illustrate embodiments and serve, in conjunction with the description, for explaining principles and concepts of the disclosure.

Other embodiments, and numerous of the stated advantages, will emerge with regard to the drawings. The illustrated elements of the drawings are not necessarily shown to scale with respect to one another.

In the drawings.

DETAILED DESCRIPTION

In the figures, the same reference designations are used to denote identical or functionally identical elements, parts or components, unless stated otherwise.

Figure 1:
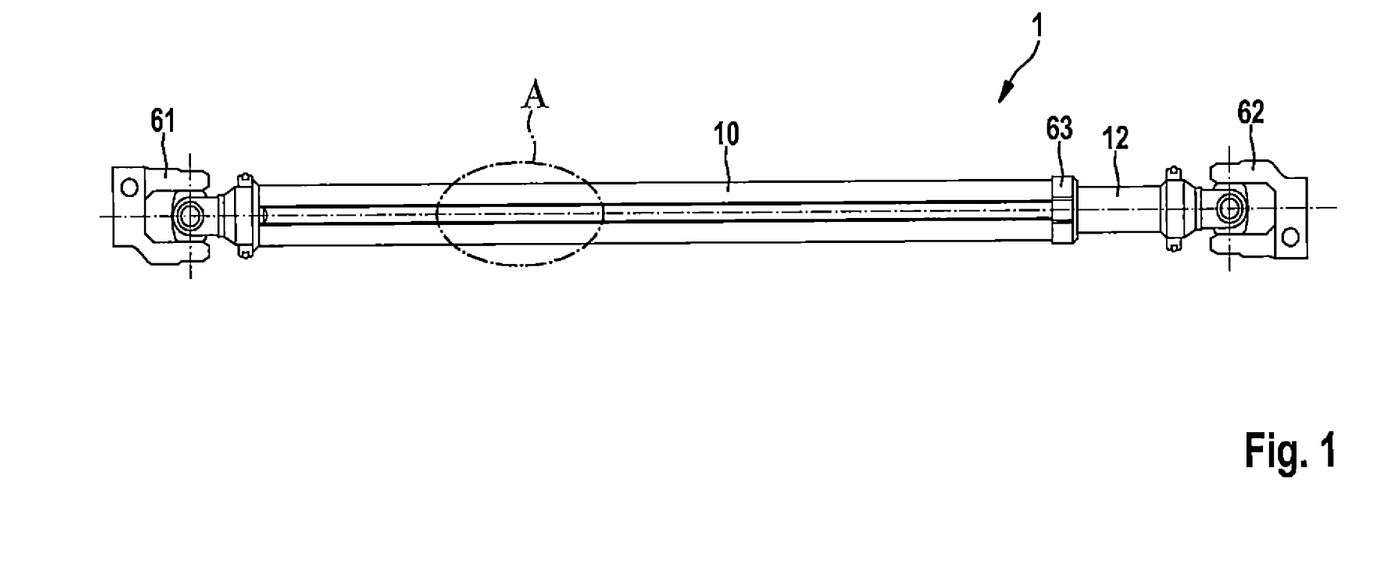
FIG. 1 is a schematic illustration of an intermediate steering shaft for a motor vehicle as per a preferred embodiment of the disclosure.

FIG. 1 is a schematic illustration of an intermediate steering shaft for a motor vehicle as per a preferred embodiment of the disclosure.

The intermediate steering shaft 1 for a motor vehicle has an outer hollow shaft 10, an inner hollow shaft 12 and a profiled shaft (not shown in FIG. 1) which connects the outer hollow shaft 10 and the inner hollow shaft 12 to one another. The intermediate steering shaft 1 is connected at a first end to a first ball joint 61 and at a second end to a second ball joint 62. The intermediate steering shaft 1 can be telescopically lengthened and shortened proceeding from an initial position in order to compensate relative movements that occur between a driver's cab and a chassis during driving operation of the motor vehicle, such that said relative movements do not have an adverse effect on the steering characteristics of the vehicle. The intermediate steering shaft 1 furthermore has, on an end of the outer hollow shaft 10 at which the inner hollow shaft 12 emerges from the outer hollow shaft 10, a stripper 63 which preferably has a seal.

Thus, in the event of a rotation of the outer hollow shaft 10 effected by means of a rotational movement of a steering column of the motor vehicle, the torque is transmitted to the inner hollow shaft 12 and from the latter to a steering gear of the motor vehicle.

Figure 2:
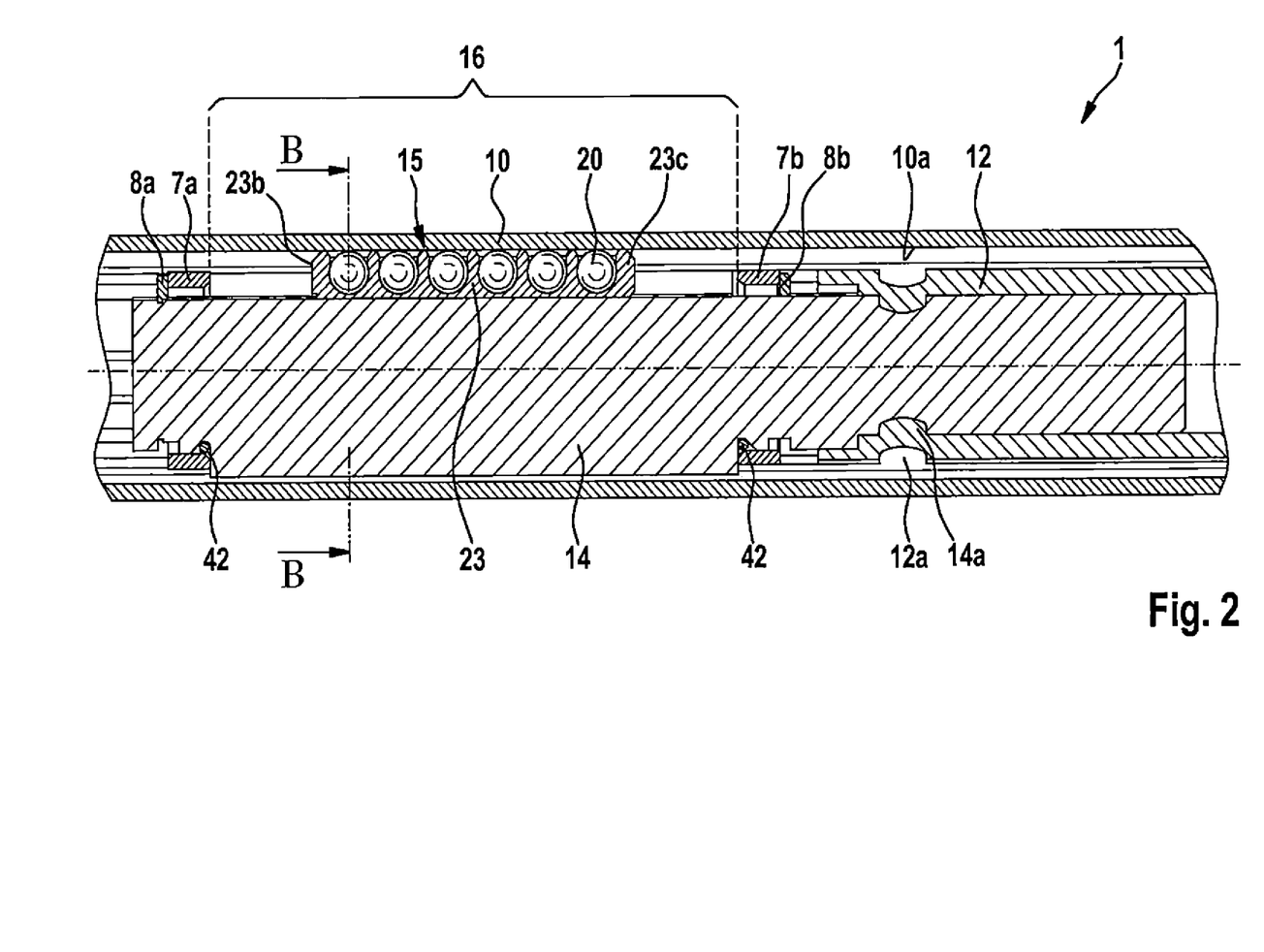
FIG. 2 shows a longitudinal sectional view of a partial section, indicated in FIG. 1, of the intermediate steering shaft as per the preferred embodiment of the disclosure.

FIG. 2 shows a longitudinal sectional view through a subsection, indicated in FIG. 1, of the intermediate steering shaft as per the preferred embodiment of the disclosure.

The intermediate steering shaft 1 is shown in FIG. 2 in the assembled state. Here, the profiled shaft 14 has been inserted into the outer hollow shaft 10, to which profiled shaft the inner hollow shaft 12 is connected via sections 12*a* of concave form in a circumferential direction that engage with concavely formed sections 14*a* of the profiled shaft 14. The profiled shaft 14 is designed such that it can be guided in the outer hollow shaft 10 by means of a multiplicity (not shown in FIG. 2) of guide arrangements. The guide arrangements permit a displacement of the profiled shaft 14, and of the inner hollow shaft 12 connected thereto, in the axial direction of the outer hollow shaft 10.

A first guide arrangement 15 has in each case one section of substantially concave form (not shown in FIG. 2) on an inner circumference 10*a* of the outer hollow shaft 10, in each case one first guide rail and second guide rail (not shown in FIG. 2) arranged on a receiving section of the profiled shaft, and a multiplicity of balls, which are arranged in a cavity formed between the section of substantially concave form of the outer hollow shaft, the first guide rail and the second guide rail.

The balls 20 are preferably inserted into a ball cage 23 and separated from one another by receiving devices of the ball cage 23.

The intermediate steering shaft 1 furthermore has axial end stops of the ball cage 23 at respective end sections of the receiving section of the profiled shaft 14. The end stops of the ball cage 23 are formed by a first delimiting ring 7*a*, which is arranged on the profiled shaft 14 at this a first axial end section 23*b* of the ball cage 23, and a second delimiting ring 7*b*, which is arranged on the profiled shaft 14 at a second axial end section 23*c* of the ball cage 23. The first delimiting ring 7*a* is preferably fixed to the profiled shaft 14 by means of a first securing ring 8*a*. The second delimiting ring 7*b* is preferably fixed to the profiled shaft 14 by means of a second securing ring 8*b*.

Furthermore, an elastic element 42 is shown which is arranged between a guide rail (not shown in FIG. 2) and the receiving section of the profiled shaft.

Figure 3:
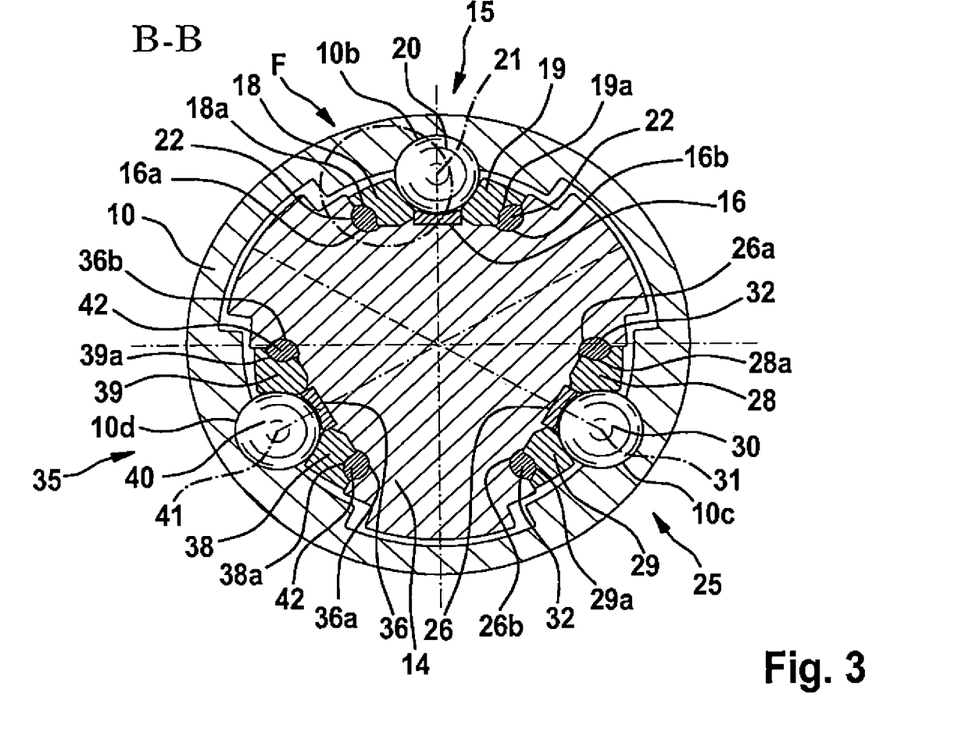
FIG. 3 shows a cross-sectional view, in the section plane B-B illustrated in FIG. 2, of the intermediate steering shaft for a motor vehicle as per the preferred embodiment of the disclosure.

FIG. 3 shows a cross-sectional view, in the section plane B-B illustrated in FIG. 2, of the intermediate steering shaft for a motor vehicle as per the preferred embodiment of the disclosure.

In the present view, the outer hollow shaft 10 is connected to the profiled shaft 14 by means of the guide arrangements 15, 25, 35. In the present preferred embodiment, the intermediate steering shaft 1 has three guide arrangements 15, 25, 35. The guide arrangements 15, 25, 35 serve for the displacement of the profiled shaft 14 and of the inner hollow shaft 12, which is connected to said profiled shaft, in the axial direction of the outer hollow shaft 10.

A first guide arrangement 15 is pre-installed on the profiled shaft 14 and has a section 10*b* of the outer hollow shaft 10, which is formed in a substantially concave manner on an inner circumference 10*a* of the outer hollow shaft 10, a first guide rail 18, a second guide rail 19 and a multiplicity of balls 20, which are arranged in a cavity 21 formed between the section 10*b* of substantially concave form of the outer hollow shaft 10, the first guide rail 18 and the second guide rail 19.

The profiled shaft 14 has a first receiving section 16 which is of substantially arc-shaped form. The first receiving section 16 of the profiled shaft, the first guide rail 18 and the second guide rail 19 are preferably of arc-shaped form such that an arc shape of the first guide rail 18 and of the second guide rail 19 is substantially adapted to an arc shape of the receiving section 16 of the profiled shaft 14.

An elastic element 22 is preferably arranged between the first guide rail 18 and the first receiving section 16 of the profiled shaft 14 and between the second guide rail 19 and the first receiving section 16 of the profiled shaft 14. The elastic element 22 is preferably arranged partially in a first recess 16*a* and second recess 16*b* formed in the first receiving section 16 of the profiled shaft 14 and at least partially in a recess 18*a* formed in the first guide rail 18 and in a recess 19*a* formed in the second guide rail 19.

The elastic element 22 is preferably formed as a rubber profile. Alternatively, the elastic element 22 may for example be formed as a plastics profile. Here, the elastic element 22 is preferably adapted to a shaping of the first receiving section 16 of the profiled shaft 14, wherein the elastic element 22 is preferably formed in one piece and placed into the first receiving section 16 of the profiled shaft 14. In the present embodiment, the elastic element 22 thus has a substantially rectangular shape. Alternatively, the elastic element 22 may for example also have some other suitable shape.

The second guide arrangement 25 is pre-installed on the profiled shaft 14 and has a section 10*c* of the outer hollow shaft 10, which is formed in a substantially concave manner on an inner circumference 10*a* of the outer hollow shaft 10, a first guide rail 28, a second guide rail 29 and a multiplicity of balls 30, which are arranged in a cavity 31 formed between the section 10*c* of substantially concave form of the outer hollow shaft 10, the first guide rail 28 and the second guide rail 29.

The profiled shaft 14 has a second receiving section 26 which is of substantially arc-shaped form. The second receiving section 26 of the profiled shaft, the first guide rail 28 and the second guide rail 29 are preferably of arc-shaped form such that an arc shape of the first guide rail 28 and of the second guide rail 29 is substantially adapted to an arc shape of the receiving section 26 of the profiled shaft 14.

An elastic element 32 is preferably arranged between the first guide rail 28 and the second receiving section 26 of the profiled shaft 14 and between the second guide rail 29 and the second receiving section 26 of the profiled shaft 14. The elastic element 32 is preferably arranged partially in a first recess 26*a* and second recess 26*b* formed in the second receiving section 26 of the profiled shaft 14 and at least partially in a recess 28*a* formed in the first guide rail 28 and in a recess 29*a* formed in the second guide rail 29.

The elastic element 32 is preferably formed as a rubber profile. Alternatively, the elastic element 32 may for example be formed as a plastics profile. Here, the elastic element 32 is preferably adapted to a shaping of the second receiving section 26 of the profiled shaft 14, wherein the elastic element 32 is preferably formed in one piece and placed into the second receiving section 26 of the profiled shaft 14. In the present embodiment, the elastic element 32 thus has a substantially rectangular shape. Alternatively, the elastic element 32 may for example also have some other suitable shape.

The third guide arrangement 35 is pre-installed on the profiled shaft 14 and has a section 10*e* of the outer hollow shaft 10, which is formed in a substantially concave manner on an inner circumference 10*a* of the outer hollow shaft 10, a first guide rail 38, a second guide rail 39 and a multiplicity of balls 40, which are arranged in a cavity 41 formed between the section 10*e* of substantially concave form of the outer hollow shaft 10, the first guide rail 38 and the second guide rail 39.

The profiled shaft 14 has a third receiving section 36 which is of substantially arc-shaped form. The third receiving section 36 of the profiled shaft, the first guide rail 38 and the second guide rail 39 are preferably of arc-shaped form such that an arc shape of the first guide rail 38 and of the second guide rail 39 is substantially adapted to an arc shape of the receiving section 36 of the profiled shaft 14.

An elastic element 42 is preferably arranged between the first guide rail 38 and the third receiving section 36 of the profiled shaft 14 and between the second guide rail 39 and the third receiving section 36 of the profiled shaft 14. The elastic element 42 is preferably arranged partially in a first recess 36a and second recess 36b formed in the third receiving section 36 of the profiled shaft 14 and at least partially in a recess 38a formed in the first guide rail 38 and in a recess 39a formed in the second guide rail 39.

The elastic element 42 is preferably formed as a rubber profile. Alternatively, the elastic element 42 may for example be formed as a plastics profile. Here, the elastic element 42 is preferably adapted to a shaping of the third receiving section 36 of the profiled shaft 14, wherein the elastic element 42 is preferably formed in one piece and placed into the third receiving section 36 of the profiled shaft 14. In the present embodiment, the elastic element 42 thus has a substantially rectangular shape. Alternatively, the elastic element 42 may for example also have some other suitable shape.

Figure 4:
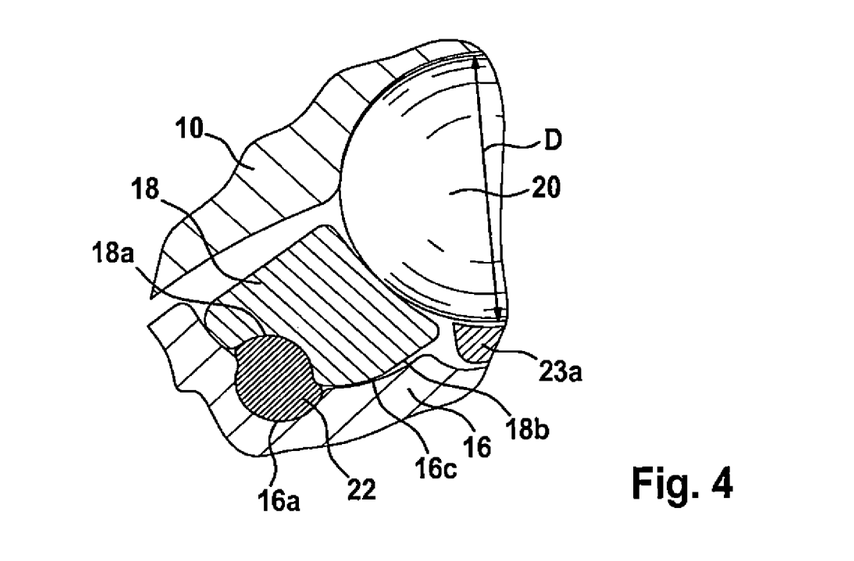
FIG. 4 shows an enlarged detail view of the region F, illustrated in FIG. 3, of the intermediate steering shaft for a motor vehicle as per the preferred embodiment of the disclosure.

FIG. 4 shows an enlarged detail view of the region F, illustrated in FIG. 3, of the intermediate steering shaft for a motor vehicle as per the preferred embodiment of the disclosure.

A surface 18b, arranged opposite the first receiving section 16 of the profiled shaft 14, of the first guide rail 18 preferably has, adjacent to the recess 18a formed in the first guide rail 18 for receiving the elastic element 22, a curvature which is greater than a curvature of a surface 16c of the first receiving section 16 of the profiled shaft 14. The surface 18b of the first guide rail 18 is in particular preferably formed such that the surface 18b has, on both sides adjacent to the recess 18a formed in the first guide rail 18 for receiving the elastic element 22, in each case a curvature which is greater than a curvature of a surface 16c of the first receiving section 16 of the profiled shaft 14.

The first guide rail 18 thus advantageously has two bearing surfaces on the receiving section 16 of the profiled shaft 14, wherein the bearing surfaces are formed so as to be significantly smaller than the surface 16c of the first receiving section 16 of the profiled shaft 14.

Thus, the first guide rail 18 advantageously has only a small bearing surface on the surface 16c of the first receiving section 16 of the profiled shaft 14. A low-friction sliding movement of the first guide rail 18 along the surface of the first receiving section 16 of the profiled shaft 14 can thus be made possible.

The first guide rail 18 is advantageously mounted so as to be rotatable about the surface 16c of the first receiving section 16 of the profiled shaft 14. Thus, for example during a transmission of torque from the outer hollow shaft 10 to the profiled shaft 14, effective play compensation of the first guide arrangement 15 with respect to the outer hollow shaft 10 can be ensured.

The first guide rail 18 is preferably arranged in relation to the first receiving section 16 of the profiled shaft 14 such that the recess 18a formed in the first guide rail 18 for receiving the elastic element 22 is arranged offset with a predetermined spacing with respect to the first recess 16a formed in the first receiving section 16 of the profiled shaft 14 for receiving the elastic element 22. Thus, the elastic element 22 is placed under shear load and exerts a preload on the first guide arrangement 15.

Furthermore, FIG. 4 shows a base section 23a of the ball cage for receiving the multiplicity of balls 20.

Figure 5:
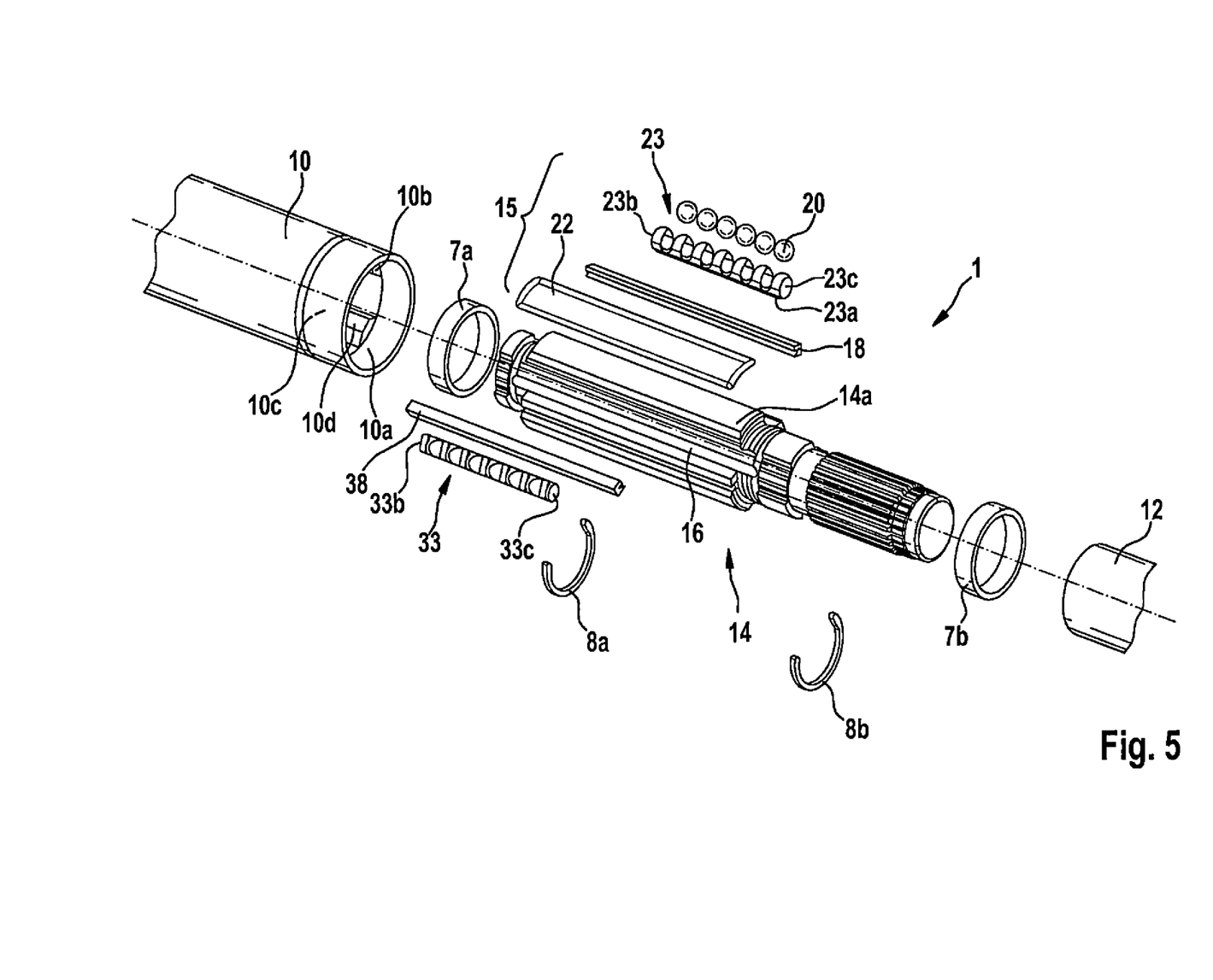
FIG. 5 is an exploded illustration of the intermediate steering shaft for a motor vehicle as per the preferred embodiment of the disclosure.

FIG. 5 is an exploded illustration of the intermediate steering shaft for a motor vehicle as per the preferred embodiment of the disclosure.

The intermediate steering shaft 1 for a motor vehicle has the outer hollow shaft 10, the inner hollow shaft 12 and the profiled shaft 14 which connects the outer hollow shaft 10 and the inner hollow shaft 12 to one another. The profiled shaft 14 is designed such that it can be guided by means of the multiplicity of guide arrangements 15 in the outer hollow shaft 10. The illustration of FIG. 5 shows only one of the multiplicity of guide arrangements. The guide arrangements 15 permit a displacement of the profiled shaft 14, and of the inner hollow shaft 12, which is connected to said profiled shaft, in the axial direction of the outer hollow shaft 10. The multiplicity of guide arrangements 15 has in each case one section 10b, 10c, 10d formed in a substantially concave manner on the inner circumference 10a of the outer hollow shaft 10, and in each case one first guide rail 18 and second guide rail (not shown in FIG. 5) arranged on the first receiving section 16 of the profiled shaft 14. Furthermore, the multiplicity of guide arrangements 15 has a multiplicity of balls 20 arranged between the section 10b, 10c, 10d of in each case substantially concave form of the outer hollow shaft 10 and the first and second guide rail. The balls 20 are preferably inserted into a ball cage 23.

The intermediate steering shaft 1 furthermore has axial end stops 23b, 23c of the ball cage 23 at respective end sections of the receiving sections 16, 26, 36 of the profiled shaft 14. The axial end stops 23b, 23c of the ball cage 23 are formed by the first delimiting ring 7a arranged on the profiled shaft 14 at the first axial end section 23b of the ball cage 23 and the second delimiting ring 7b arranged on the profile shaft 14 at the second axial end section 23c of the ball cage 23. The first delimiting ring 7a is preferably fixed to the profiled shaft 14 by means of the first securing ring 8a. The second delimiting ring 7b is preferably fixed to the profile shaft 14 by means of the second securing ring 8b.

Figure 6:
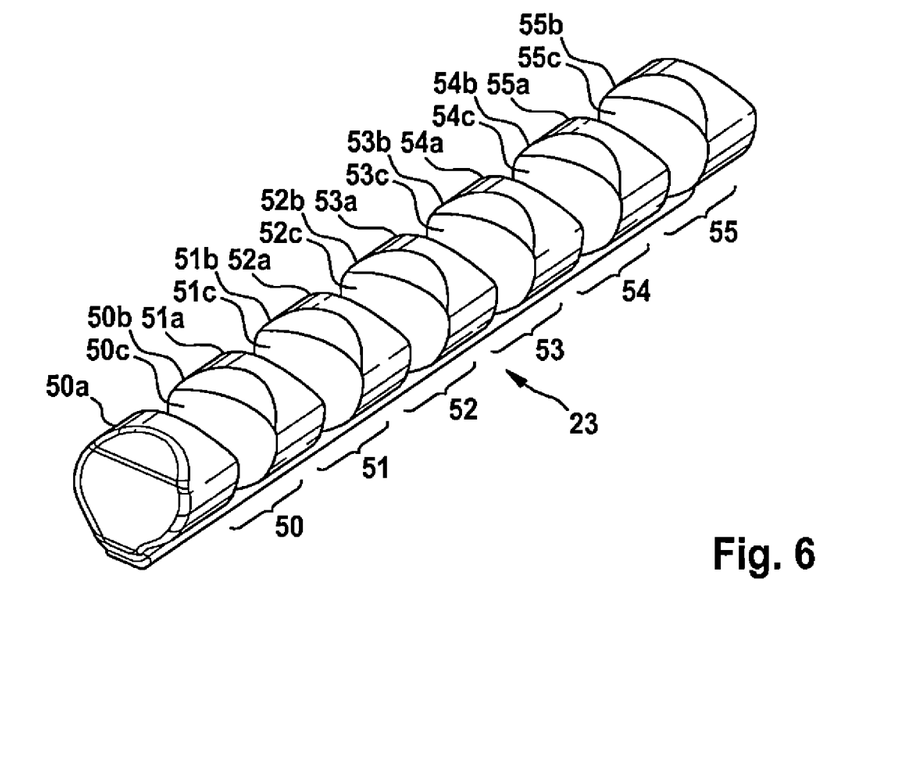
FIG. 6 is a schematic illustration of a ball cage of the intermediate steering shaft as per the preferred embodiment of the disclosure.

FIG. 6 is a schematic illustration of a ball cage of the intermediate steering shaft as per the preferred embodiment of the disclosure.

The multiplicity of balls (not shown in FIG. 6) is preferably arranged in the ball cage 23. The ball cage 23 advantageously has a multiplicity of receiving devices 50, 51, 52, 53, 54, 55 of substantially hollow cylindrical form for receiving the balls. A respective receiving device 50, 51, 52, 53, 54, 55 has two semicylindrical receiving elements 50a, 50b, 51a, 51b, 52a, 52b, 53a, 53b, 54a, 54b, 55a, 55b which are arranged spaced apart from one another in an axial direction of the receiving device 50, 51, 52, 53, 54, 55 and which are beveled in an insertion region 50c, 51c, 52c, 53c, 54c, 55c for the insertion of the balls.

Figure 7:
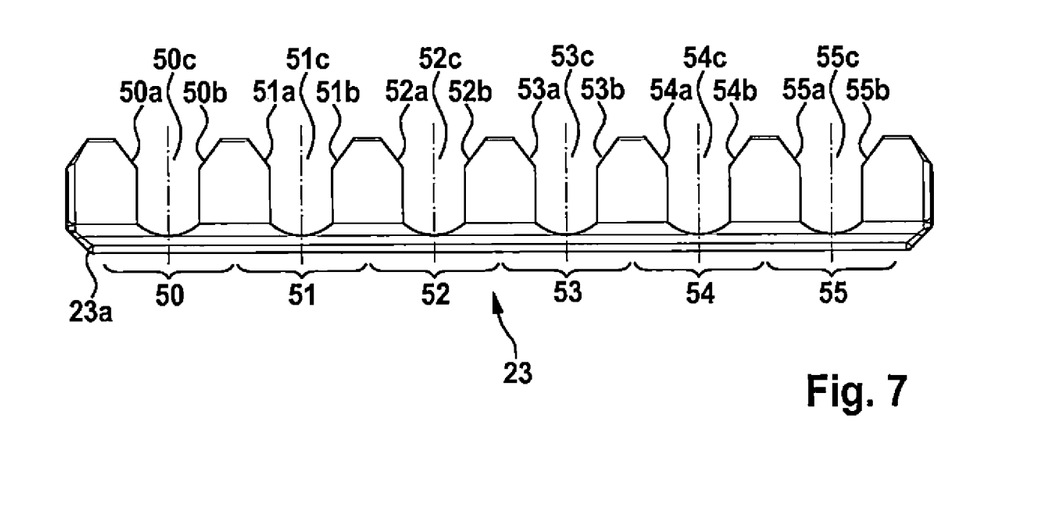
FIG. 7 shows a side view of the ball cage of the intermediate steering shaft as per the preferred embodiment of the disclosure.

FIG. 7 shows a side view of the ball cage of the intermediate steering shaft as per the preferred embodiment of the disclosure.

The semicylindrical receiving elements 50a, 50b, 51a, 51b, 52a, 52b, 53a, 53b, 54a, 54b, 55a, 55b are preferably arranged spaced apart from one another in the axial direction such that a spacing between in each case two receiving elements 50a, 50b, 51a, 51b, 52a, 52b, 53a, 53b, 54a, 54b, 55a, 55b of the receiving device 50, 51, 52, 53, 54, 55 in the insertion region 50c, 51c, 52c, 53c, 54c, 55c for the insertion of the balls is smaller than a diameter of a respective ball.

The multiplicity of receiving devices 50, 51, 52, 53, 54, 55 of substantially hollow cylindrical form is connected to a base section 23a of the ball cage 23 by means of a strip formed in the axial direction of the ball cage 23. The receiving elements 50a, 50b, 51a, 51b, 52a, 52b, 53a, 53b, 54a, 54b, 55a, 55b are formed so as to be bendable in the axial direction of the ball cage 23 relative to the strip formed on the base section 23a of the ball cage 23.

Figure 8:
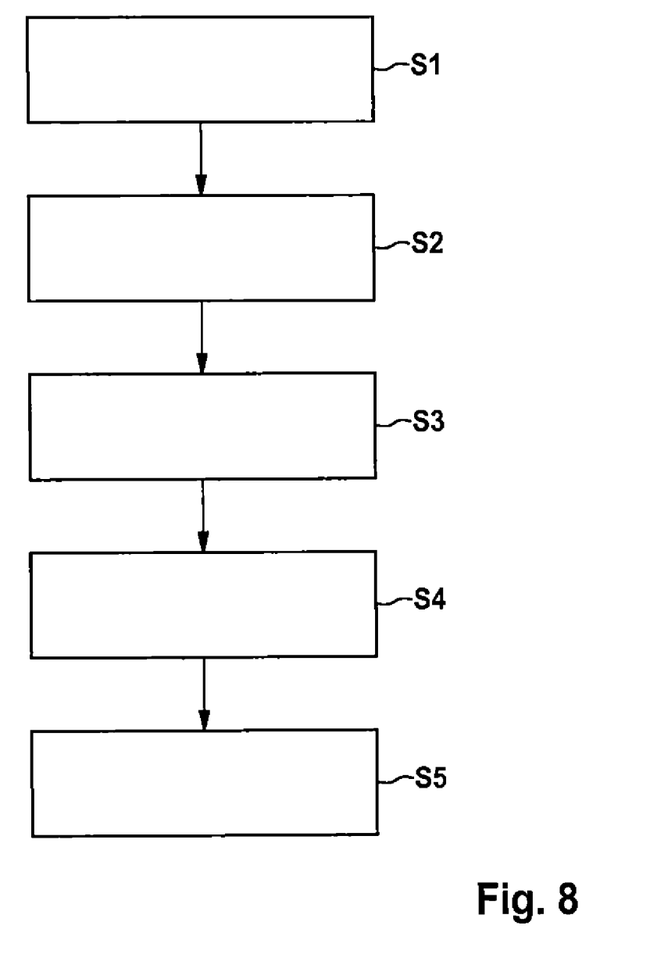
FIG. 8 shows a flow diagram of a method for operating an intermediate steering shaft for a motor vehicle as per the preferred embodiment of the disclosure.

FIG. 8 shows a flow diagram of a method for operating an intermediate steering shaft for a motor vehicle as per the preferred embodiment of the disclosure.

The method for operating the intermediate steering shaft for a motor vehicle comprises providing S1 an outer hollow shaft. The method furthermore comprises providing S2 an inner hollow shaft which is arranged at least partially in the outer hollow shaft.

The method moreover comprises providing S3 a profiled shaft which is arranged in the outer hollow shaft and which connects the outer hollow shaft and the inner hollow shaft to one another.

The method furthermore comprises providing S4 a multiplicity of guide arrangements which guide the profiled shaft in the outer hollow shaft and which serve for the displacement of the profiled shaft and of the inner hollow shaft, which is connected to said profiled shaft, in an axial direction of the outer hollow shaft, wherein the multiplicity of guide arrangements provides a section of substantially concave form on an inner circumference of the outer hollow shaft, a first guide rail arranged on a receiving section of the profiled shaft, a second guide rail arranged on the receiving section of the profiled shaft, and a multiplicity of balls which are arranged in a cavity formed between the section of substantially concave form of the outer hollow shaft, the first guide rail and the second guide rail.

The method furthermore comprises providing S5 an elastic element at least partially in a first recess and second recess formed in the receiving section of the profiled shaft and at least partially in a recess formed in the first guide rail and in a recess formed in the second guide rail, which elastic element exerts a preload on the respective guide arrangement.

Even though the present disclosure has been described above on the basis of preferred exemplary embodiments, it is not restricted to these and may be modified in a variety of ways. In particular, the disclosure may be changed or modified in numerous ways without departing from the essence of the disclosure.

For example, a shape, dimension and/or machining or production method of the components of the intermediate steering shaft may be modified.

LIST OF REFERENCE DESIGNATIONS

1 Intermediate steering shaft
7a First delimiting ring
7b Second delimiting ring
8a First securing ring
8b Second securing ring
10 Outer hollow shaft
10a Inner circumference (of the outer hollow shaft)
10b Concavely formed section (of the inner circumference of the outer hollow shaft)
10c Concavely formed section (of the inner circumference of the outer hollow shaft)
10d Concavely formed section (of the inner circumference of the outer hollow shaft)
12 Inner hollow shaft
12a Inner circumference (of the inner hollow shaft)
14 Profiled shaft
14a Concavely formed section (of the profiled shaft)
15 First guide arrangement
16 Receiving section
16a, 26a, 36a First recess
16b, 26b, 36b First recess
18, 28, 38 First guide rail
18a, 28a, 38a Recess
18b, 28b, 38b Surface
19, 29, 39 Second guide rail
19a, 29a, 39a Recess
20, 30, 40 Balls
21, 31, 41 Cavity
22, 32, 42 Elastic element
23 Ball cage
23a Base section (of the ball cage)
23b, 23c Axial end section (of the ball cage)
25 Second guide arrangement
26 Second receiving section
35 Third guide arrangement
36 Third receiving section
50, 51, 52, 53, 54, 55 Receiving device
50a, 50b, 51a, 51b Receiving element
52a, 52b, 53a, 53b Receiving element
54a, 54b, 55a, 55b Receiving element
50c, 51c, 52c Insertion region
53c, 54c, 55c Insertion region
61, 62 Ball joint
63 Stripper
D Diameter
F Region

The invention claimed is:

1. An intermediate steering shaft for a motor vehicle, comprising:
   an outer hollow shaft;
   an inner hollow shaft arranged at least partially in the outer hollow shaft;
   a profiled shaft arranged in the outer hollow shaft and configured to connect the outer hollow shaft and the inner hollow shaft to one another; and
   a plurality of guide arrangements configured to guide the profiled shaft in the outer hollow shaft and to displace the profiled shaft and the inner hollow shaft, which is connected to the profiled shaft, in an axial direction of the outer hollow shaft, wherein each of the plurality of guide arrangements comprises:
      a section of substantially concave form on an inner circumference of the outer hollow shaft;
      a first guide rail arranged on a receiving section of the profiled shaft, the first guide rail including a first guide rail contact surface configured to contact a first receiving section contact surface of the receiving section;
      a second guide rail arranged on the receiving section of the profiled shaft, the second guide rail including a second guide rail contact surface configured to contact a second receiving section contact surface of the receiving section;
      a first guide rail recess defined extending into the first guide rail contact surface;
      a second guide rail recess defined extending into the second guide rail contact surface;
      a first receiving section recess defined extending into the first receiving section contact surface;
      a second receiving section recess defined extending into the second receiving section contact surface;

a plurality of balls arranged in a cavity formed between the section of substantially concave form of the outer hollow shaft, the first guide rail, and the second guide rail; and an elastic element arranged between the first guide rail and the receiving section of the profiled shaft and between the second guide rail and the receiving section of the profiled shaft, the elastic element arranged at least partially in the first receiving section recess, the second receiving section recess the first guide rail recess, and the second guide rail recess, the elastic element configured to exert a preload on the respective guide arrangement, wherein the first guide rail is arranged in relation to the receiving section of the profiled shaft such that the first guide rail recess is arranged offset from the first receiving section recess by a first predetermined spacing, wherein the second guide rail is arranged in relation to the receiving section of the profiled shaft such that the second guide rail recess is arranged offset from the second receiving section recess by a second predetermined spacing, and wherein the elastic element is subject to a shear load in a width direction of the elastic element as a result of the offset of the first guide rail recess and first receiving section recess and the offset of the second guide rail recess and second receiving section recess so as to compensate for play of the guide arrangement.

2. The intermediate steering shaft as claimed in claim 1, wherein the first receiving section contact surface, the second receiving section contact surface, the first guide rail contact surface, and the second guide rail contact surface are of arc-shaped form such that arc shapes of the first guide rail contact surface and of the second guide rail contact surface are substantially adapted to respective arc shapes of the first receiving section contact surface and the second receiving section contact surface.

3. The intermediate steering shaft as claimed in claim 2, wherein each of the first and second guide rail recesses extends into the respective first and second guide rail contact surface in a radial direction of the arc shapes of the first and second guide rail contact surfaces, and each of the first and second receiving section recesses extends into the respective first and second receiving rail contact surface in a radial direction of the arc shapes of the first and second receiving rail contact surfaces.

4. The intermediate steering shaft as claimed in claim 1, wherein:
at least part of the first guide rail contact surface has, adjacent to the first guide rail recess, a first curvature that is greater than a curvature of the first receiving section contact surface, and
at least part of the second guide rail contact surface has, adjacent to the second guide rail recess, a second curvature that is greater than a curvature of the second receiving section contact surface.

5. The intermediate steering shaft as claimed in claim 4, wherein the first guide rail and the second guide rail are mounted so as to be rotatable about the first and second receiving section contact surfaces.

6. The intermediate steering shaft as claimed in claim 1, further comprising:
a ball cage in which the plurality of balls is arranged, the ball cage including a plurality of receiving devices of substantially hollow cylindrical form configured to receive the balls, each receiving device of the plurality of receiving devices including two semicylindrical receiving elements which are arranged spaced apart from one another in an axial direction of the receiving device and which are beveled in an insertion region for insertion of the balls.

7. The intermediate steering shaft as claimed in claim 6, wherein the semicylindrical receiving elements are arranged spaced apart from one another in the axial direction such that a spacing between each adjacent pair of receiving elements in the insertion region is smaller than a diameter of a respective ball of the plurality of balls.

8. The intermediate steering shaft as claimed in claim 6, wherein:
each receiving device of the plurality of receiving devices is connected to a base section of the ball cage by a strip formed in the axial direction of the ball cage, and
each receiving element is bendable in the axial direction of the ball cage relative to the strip formed on the base section of the ball cage.

9. The intermediate steering shaft as claimed in claim 6, wherein:
an axial end stop of the ball cage is formed by delimiting rings arranged on the profiled shaft at axial end sections of the ball cage, and
the delimiting rings are fixed on the profiled shaft in each case by a securing ring.

10. The intermediate steering shaft as claimed in claim 1, wherein:
the inner hollow shaft and the profiled shaft each have, in an overlap region, mutually adjacently arranged sections which are of concave form in a circumferential direction, and
the concavely formed section of the inner hollow shaft engages with the concavely formed section of the profiled shaft to axially fasten the profiled shaft to the inner hollow shaft.

11. An intermediate steering shaft for a motor vehicle, comprising:
an outer hollow shaft;
an inner hollow shaft arranged at least partially in the outer hollow shaft;
a profiled shaft arranged in the outer hollow shaft and configured to connect the outer hollow shaft and the inner hollow shaft to one another; and
a plurality of guide arrangements configured to guide the profiled shaft in the outer hollow shaft and to displace the profiled shaft and the inner hollow shaft, which is connected to the profiled shaft, in an axial direction of the outer hollow shaft, wherein each of the plurality of guide arrangements comprises:
a section of substantially concave form on an inner circumference of the outer hollow shaft;
a first guide rail arranged on a receiving section of the profiled shaft;
a second guide rail arranged on the receiving section of the profiled shaft;
a plurality of balls arranged in a cavity formed between the section of substantially concave form of the outer hollow shaft, the first guide rail, and the second guide rail; and
an elastic element arranged between the first guide rail and the receiving section of the profiled shaft and between the second guide rail and the receiving section of the profiled shaft, the elastic element further arranged at least partially in a first recess and second recess formed in the receiving section of the profiled shaft, and at least partially in a recess formed in the first guide rail, and in a recess formed in the second guide rail, the elastic element configured to exert a preload on the respective guide arrangement, wherein the first guide rail is arranged in relation to the receiving section of the profiled shaft such that the recess formed in the first guide rail configured to receive the elastic element is arranged offset with a predetermined spacing with respect to the first recess formed in the receiving section of the profiled shaft for receiving the elastic element, wherein the second guide rail is arranged in relation to the receiving section of the profiled shaft such that the recess formed in the second guide rail for receiving the elastic element is arranged offset with a predetermined spacing with respect to the second recess formed in the receiving section of the profiled shaft for receiving the elastic element, wherein the elastic element is configured for placement under shear load in a width direction for purposes of play compensation of the guide arrangement, wherein a surface of the first guide rail (i) is arranged so as to be situated opposite the receiving section of the profiled shaft, and (ii) has, adjacent to the recess formed in the first guide rail for receiving the elastic element, a curvature at least in sections, which curvature is greater than a curvature of a surface of the receiving section of the profiled shaft, and wherein a surface of the second guide rail (i) is arranged so as to be situated opposite the receiving section of the profiled shaft, and (ii) has, adjacent to the recess formed in the second guide rail for receiving the elastic element, a curvature at least in sections, which curvature is greater than a curvature of the surface of the receiving section of the profiled shaft.

12. An intermediate steering shaft for a motor vehicle, comprising:
   an outer hollow shaft;
   an inner hollow shaft arranged at least partially in the outer hollow shaft;
   a profiled shaft arranged in the outer hollow shaft and configured to connect the outer hollow shaft and the inner hollow shaft to one another;
   a plurality of guide arrangements configured to guide the profiled shaft in the outer hollow shaft and to displace the profiled shaft and the inner hollow shaft, which is connected to the profiled shaft, in an axial direction of the outer hollow shaft, wherein each of the plurality of guide arrangements comprises:
      a section of substantially concave form on an inner circumference of the outer hollow shaft;
      a first guide rail arranged on a receiving section of the profiled shaft;
      a second guide rail arranged on the receiving section of the profiled shaft;
      a plurality of balls arranged in a cavity formed between the section of substantially concave form of the outer hollow shaft, the first guide rail, and the second guide rail;
      an elastic element arranged between the first guide rail and the receiving section of the profiled shaft and between the second guide rail and the receiving section of the profiled shaft, the elastic element further arranged at least partially in a first recess and second recess formed in the receiving section of the profiled shaft, and at least partially in a recess formed in the first guide rail, and in a recess formed in the second guide rail, the elastic element configured to exert a preload on the respective guide arrangement; and
      a ball cage in which the plurality of balls is arranged, the ball cage including a plurality of receiving devices of substantially hollow cylindrical form configured to receive the balls, each receiving device of the plurality of receiving devices including two semicylindrical receiving elements which are arranged spaced apart from one another in an axial direction of the receiving device and which are beveled in an insertion region for the insertion of the balls, wherein the first guide rail is arranged in relation to the receiving section of the profiled shaft such that the recess formed in the first guide rail configured to receive the elastic element is arranged offset with a predetermined spacing with respect to the first recess formed in the receiving section of the profiled shaft for receiving the elastic element, wherein the second guide rail is arranged in relation to the receiving section of the profiled shaft such that the recess formed in the second guide rail for receiving the elastic element is arranged offset with a predetermined spacing with respect to the second recess formed in the receiving section of the profiled shaft for receiving the elastic element, and wherein the elastic element is configured for placement under shear load in a width direction for purposes of play compensation of the guide arrangement.

* * * * *